United States Patent
Corman et al.

(10) Patent No.: US 9,334,925 B2
(45) Date of Patent: May 10, 2016

(54) BREAKAWAY ROPE HOLDER SYSTEM AND METHOD

(71) Applicants: Jerry Corman, Canyon, TX (US); Roger Hayes, Amarillo, TX (US)

(72) Inventors: Jerry Corman, Canyon, TX (US); Roger Hayes, Amarillo, TX (US)

( * ) Notice: Subject to any disclaimer, the term of this patent is extended or adjusted under 35 U.S.C. 154(b) by 0 days.

(21) Appl. No.: 14/020,784

(22) Filed: Sep. 6, 2013

(65) Prior Publication Data
US 2014/0007383 A1    Jan. 9, 2014

Related U.S. Application Data

(63) Continuation-in-part of application No. 29/417,364, filed on Apr. 2, 2012, now abandoned.

(60) Provisional application No. 61/801,754, filed on Mar. 15, 2013.

(51) Int. Cl.
| | |
|---|---|
| *F16G 11/06* | (2006.01) |
| *F16G 11/04* | (2006.01) |
| *F16G 11/14* | (2006.01) |

(52) U.S. Cl.
CPC ............. *F16G 11/06* (2013.01); *F16G 11/048* (2013.01); *F16G 11/14* (2013.01); *Y10T 24/396* (2015.01); *Y10T 24/3958* (2015.01); *Y10T 24/3973* (2015.01); *Y10T 24/3978* (2015.01); *Y10T 24/3982* (2015.01); *Y10T 29/49826* (2015.01); *Y10T 29/49963* (2015.01)

(58) Field of Classification Search
CPC ....... F16G 11/06; F16G 11/048; F16G 11/14; Y10T 24/3982; Y10T 29/49826; Y10T 29/49963; Y10T 24/3973; Y10T 24/3958; Y10T 24/396; Y10T 24/3978
See application file for complete search history.

(56) References Cited

U.S. PATENT DOCUMENTS

| 770,062 | A | * | 9/1904 | Gartelman et al. | 24/130 |
|---|---|---|---|---|---|
| 895,590 | A | * | 8/1908 | Sprague | 24/18 |
| 1,248,973 | A | * | 12/1917 | Withrell | 403/211 |
| 1,936,009 | A | * | 11/1933 | Cummins | 403/374.4 |
| 2,530,031 | A | * | 11/1950 | Rudolph | 119/805 |
| 2,818,622 | A | * | 1/1958 | Clevett, Jr. | 24/30.5 R |
| 3,165,091 | A | * | 1/1965 | Welton | 119/805 |
| 3,841,118 | A | * | 10/1974 | Stone | 70/33 |
| 4,928,634 | A | * | 5/1990 | Voigt | 119/805 |
| 5,351,367 | A | * | 10/1994 | Kennedy et al. | 24/129 R |
| 7,784,432 | B1 | * | 8/2010 | Johnson | 119/805 |
| 2013/0171595 | A1 | * | 7/2013 | Glover et al. | 434/225 |
| 2013/0333162 | A1 | * | 12/2013 | Miller | 24/135 R |

* cited by examiner

*Primary Examiner* — Robert J Sandy
*Assistant Examiner* — Louis Mercado
(74) *Attorney, Agent, or Firm* — Shannon L Warren (57) ABSTRACT

A breakaway rope holder having a loop and a body. The loop having a first end and a second end. The body having a rope bore. The rope bore selectively receives a first end of a rope. The first end of the loop attaches to the body. The second end of the loop releaseably attaches to the body.

18 Claims, 7 Drawing Sheets

BREAKAWAY ROPE HOLDER SYSTEM AND METHOD

BACKGROUND

This disclosure relates generally to the Applicant's earlier filed design patent, U.S. patent application Ser. No. 29/417,364 and U.S. Provisional Patent Application No. 61/801,754.

Prior attempts at designing breakaway rope holders have come up short for lack of durability, level of attachment to a rope, and for myriad other shortcomings. No known prior art meet the design objectives of the current system and method and thus an improved breakaway rope holder is advantageous.

SUMMARY

A breakaway rope holder and a method of using a breakaway rope holder are disclosed.

Said breakaway rope holder comprising: a breakaway rope holder comprising a loop having a first end and a second end, a body having a rope bore. Said rope bore is capable of receiving a first end of a rope. Said first end of said loop attaches to said body. Said second end of said loop releaseably attaches to said body.

Said method of using a breakaway rope holder comprising: attaching a rope bore of a breakaway rope holder to a first end of a rope. Said breakaway rope holder comprises a loop having a first end and a second end, a body having a rope bore. Said first end of said loop attaches to said body. Said second end of said loop releaseably attaches to said body.

DETAILED DESCRIPTION

Described herein is a breakaway rope holder system and method. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIGS. 1A, 1B, 1C and 1D illustrate a perspective overview, a perspective top view, an elevated side view and an elevated front view of breakaway rope holder 100. In one embodiment, said breakaway rope holder 100 can comprise a loop 102, a body 104, a screw 106 and a weight 108. In one embodiment, said breakaway rope holder 100 can have a first end 110 and a second end 112. In one embodiment, said first end 110 can comprise said loop 102. In one embodiment, said loop 102 can have a cylindrical cross-section shape. In one embodiment, said loop 102 can have a first end 116 and a second end 118. In one embodiment, said body 104 can comprise a first side 120 and a second side 122. In one embodiment, said first end 116 of said loop 102 can attach to said first side 120 of said body 104, extend out away from said body 104 to create an enclosed loop 124, and attach to said second side 122 of said body 104 with said second end 118 of said loop 102. In one embodiment, said second end 112 of said breakaway rope holder 100 can comprise of said body 104 having a cylindrical base 114 that extends to form a "Y" shape at said first side 120 and said second side 122.

Figure 1A:
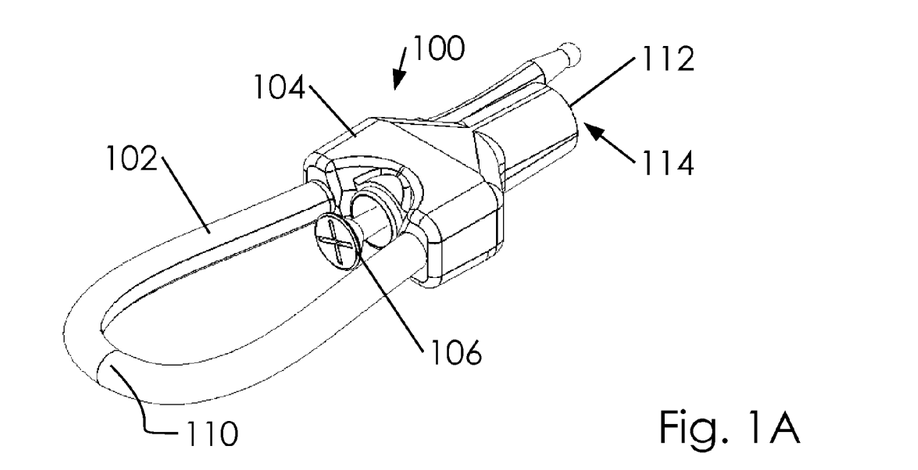
FIGS. 1A, 1B, 1C and 1D illustrate a perspective overview, a perspective top view, an elevated side view and an elevated front view of breakaway rope holder.
Figure 1B:
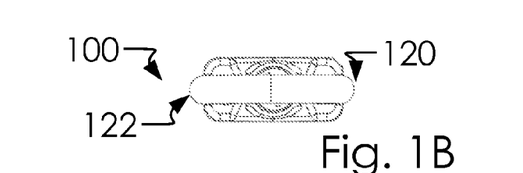
Figure 1C:
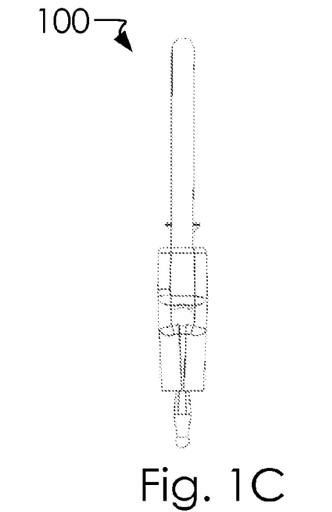
Figure 1D:
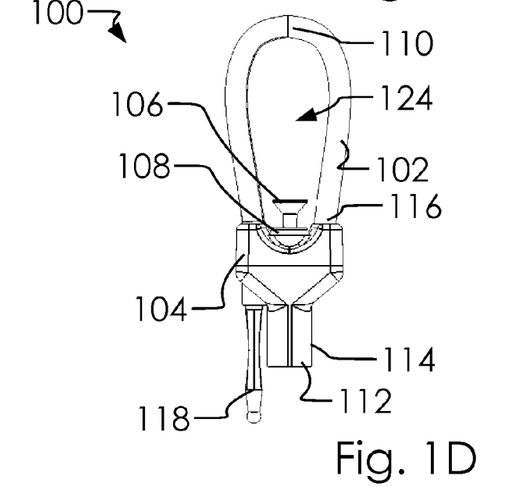
Figure 2A:
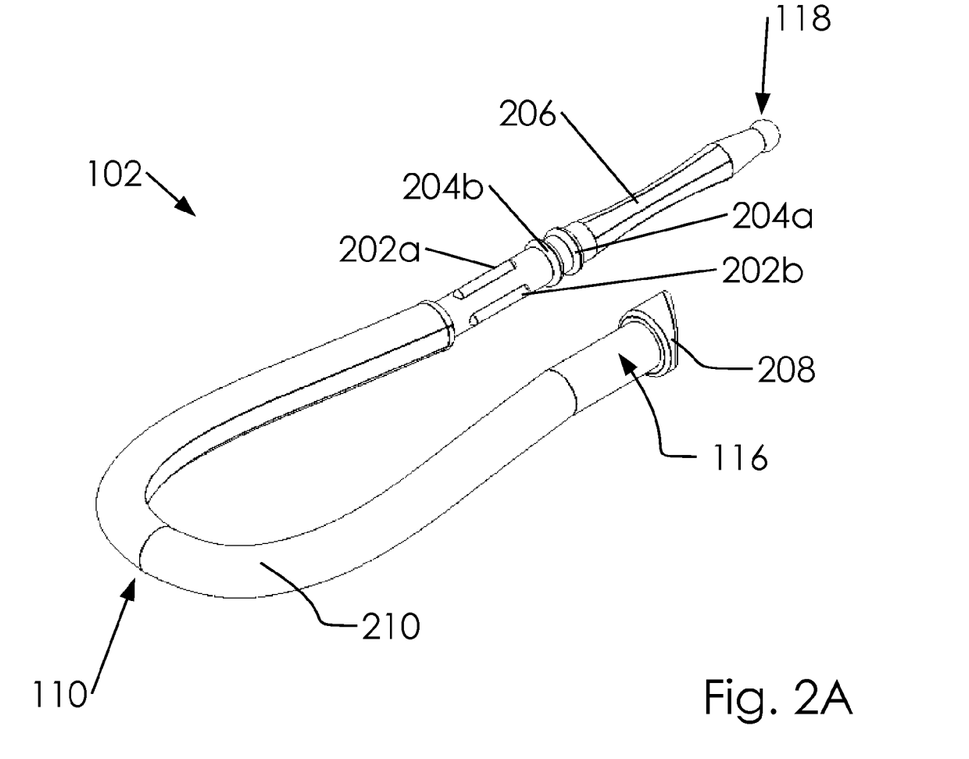
FIGS. 2A, 2B and 2C illustrate a perspective overview, an elevated side view and an elevated front view of said loop.
Figure 2B:
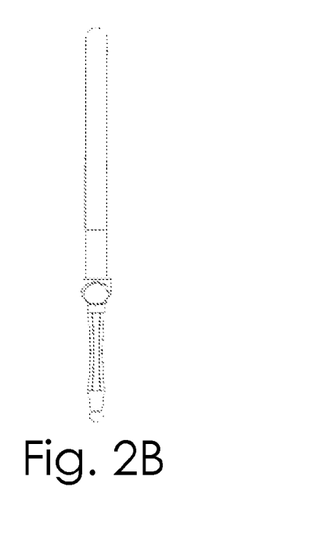
Figure 2C:
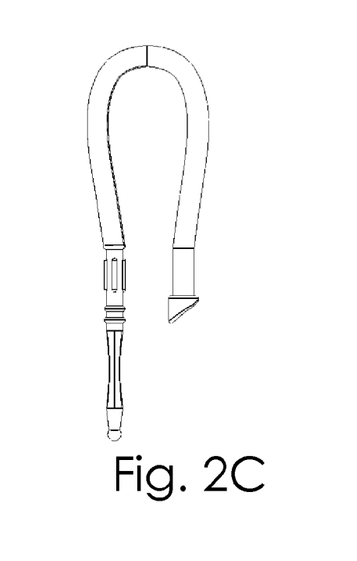
Figure 3A:
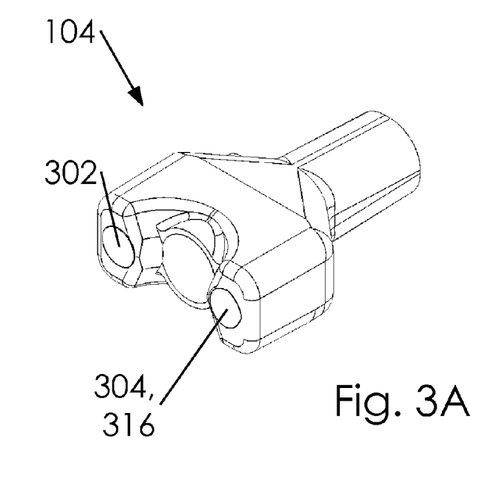
FIGS. 3A, 3B, 3C and 3D illustrate a perspective overview, a top view, an elevated side view, and an elevated front view of said body.
Figure 3B:
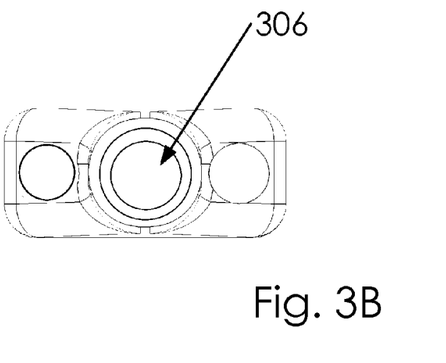
Figures 3C, 3D:
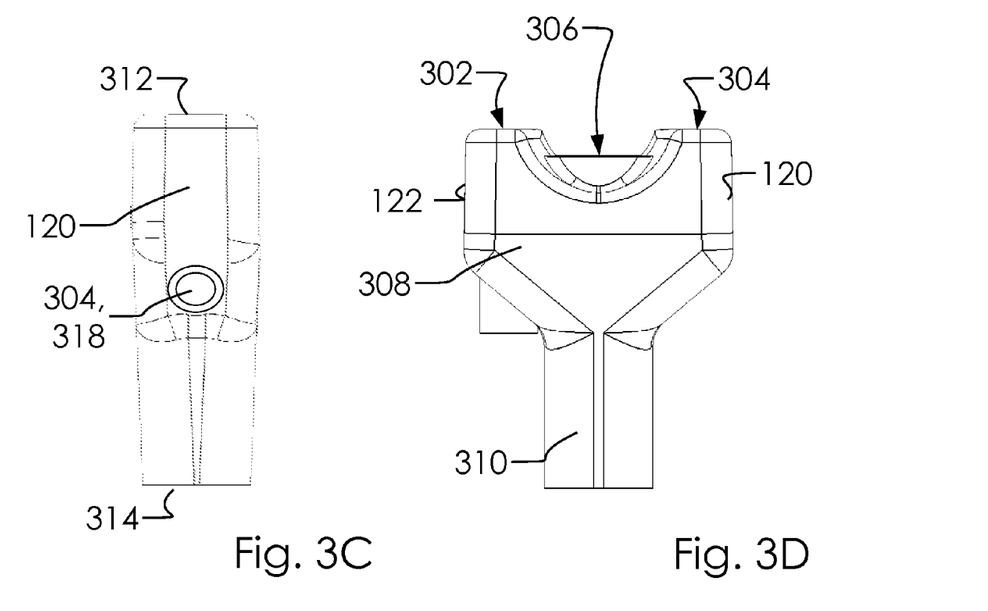

FIGS. 2A, 2B and 2C illustrate a perspective overview, an elevated side view and an elevated front view of said loop 102. In one embodiment, said loop 102 can comprise a one or more ribs, a one or more torul rings, and a one or more flutes 206, a head 208 and a looping portion 210. In one embodiment, said loop 102 can comprise a single piece material having a substantially cylindrical shape; wherein, said head 208 can be at said first end 116 of said loop 102, followed by said looping portion 210, then said one or more ribs, then said one or more torul rings, then said one or more flutes 206 and finally said second end 118. In one embodiment, said one or more ribs can comprise a first rib 202a and a second rib 202b. In one embodiment, said one or more torul rings can comprise a first torul ring 204a and a second torul ring 204b. In one embodiment, said loop 102 can have different weight inserts made of plastic, aluminum, steel, brass or the like. In one embodiment, said loop 102 can be of a "U" or "J" shape with said first end 116 and said second end 118 attached to said body 104 of said breakaway rope holder 100. In one embodiment, said loop 102 can comprise a TPU material, a market nylon and polyethylene, or similar. In one embodiment, said one or more torul rings can allow said loop 102 to lock into or catch into said body 104, as will be discussed below. In one embodiment, said one or more torul rings and/or said one or more flutes 206 can limit or suppress the axial movement within said body 104, as will be discussed below.

FIGS. 3A, 3B, 3C and 3D illustrate a perspective overview, a top view, an elevated side view, and an elevated front view of said body 104. In one embodiment, said body 104 can comprise a first bore 302, a second bore 304 and a rope bore 306. In one embodiment, said body 104 can be created in a molding process. In one embodiment, said first bore 302 can receive said first end 116 of said loop 102 and said second bore 304 can receive said second end 118 of said loop 102. In one embodiment, said body 104 can comprise a top portion 308 and a bottom portion 310. In one embodiment, said top portion 308 can be wider than said bottom portion 310, as illustrated. In one embodiment, said first bore 302 and said second bore 304 can each comprise an aperture through said top portion 308. In one embodiment, said rope bore 306 can comprise an aperture through all of said body 104. In one embodiment, said body 104 can comprise a top 312 and a bottom 314. In one embodiment, said second bore 304 can comprise a first end 316 and a second end 318.

Figure 4A:
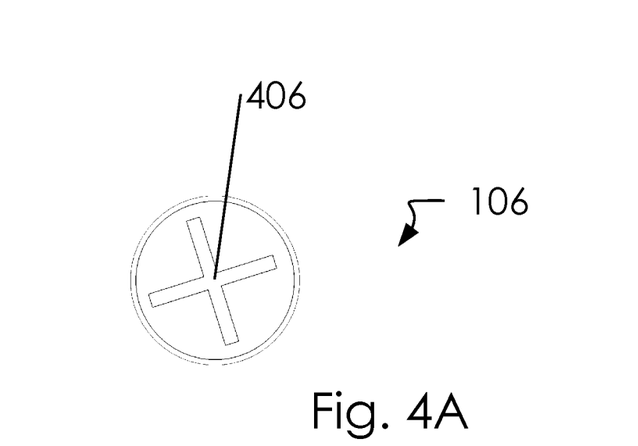
FIGS. 4A and 4B illustrate an elevated top view and an elevated side view of said screw.
Figure 4B:
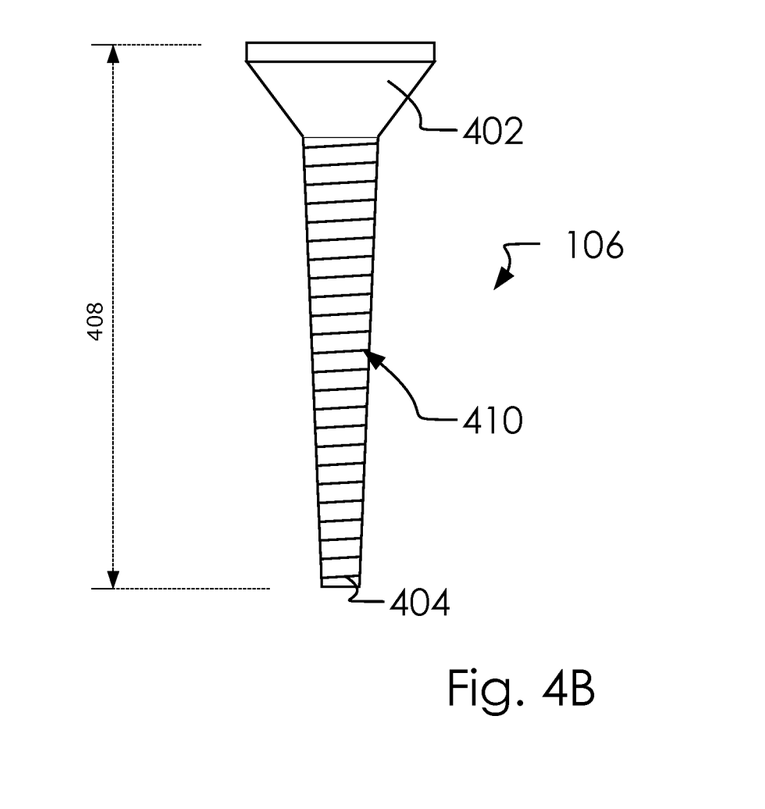
Figure 5A:
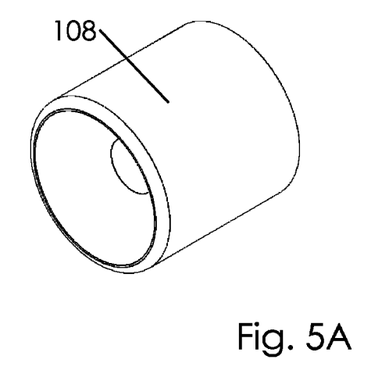
FIGS. 5A, 5B, 5C and 5D illustrate a perspective overview, an elevated top view, an elevated side view and an elevated wireframe side view of said weight.
Figure 5B:
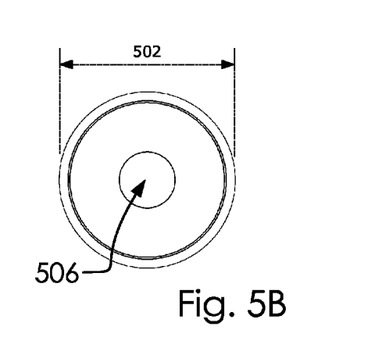
Figure 5C:
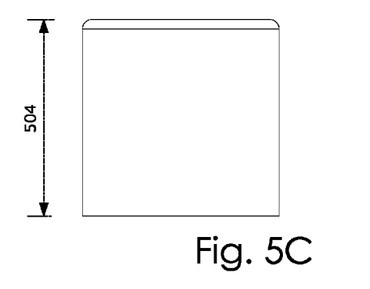
Figure 5D:
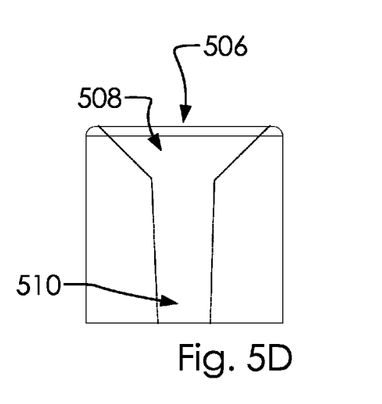

FIGS. 4A and 4B illustrate an elevated top view and an elevated side view of said screw 106. In one embodiment, said screw 106 can comprise a first end 402 (which can comprise a screw head) and a second end 404. In one embodiment, said first end 402 can comprise a Philips-head slot 406. In one embodiment, said screw 106 can be used as the anchoring mechanism to hold said weight 108 in said rope bore 306. In one embodiment, said screw 106 can have a length 408. In one embodiment, said screw 106 can comprise a threading 410.

FIGS. 5A, 5B, 5C and 5D illustrate a perspective overview, an elevated top view, an elevated side view and an elevated wireframe side view of said weight 108. In one embodiment, said weight 108 can have a diameter 502 and a length 504. In one embodiment, said weight 108 can be constructed of various mass material from plastic to brass, and said length 504 can be modified to create different weight and shape profiles to change characteristics of said breakaway rope holder 100. In one embodiment, said weight 108 can comprise a bore 506 having an upper portion 508 and a lower portion 510. In one embodiment, said upper portion 508 can be broader than said lower portion 510.

Figures 6A, 6B:
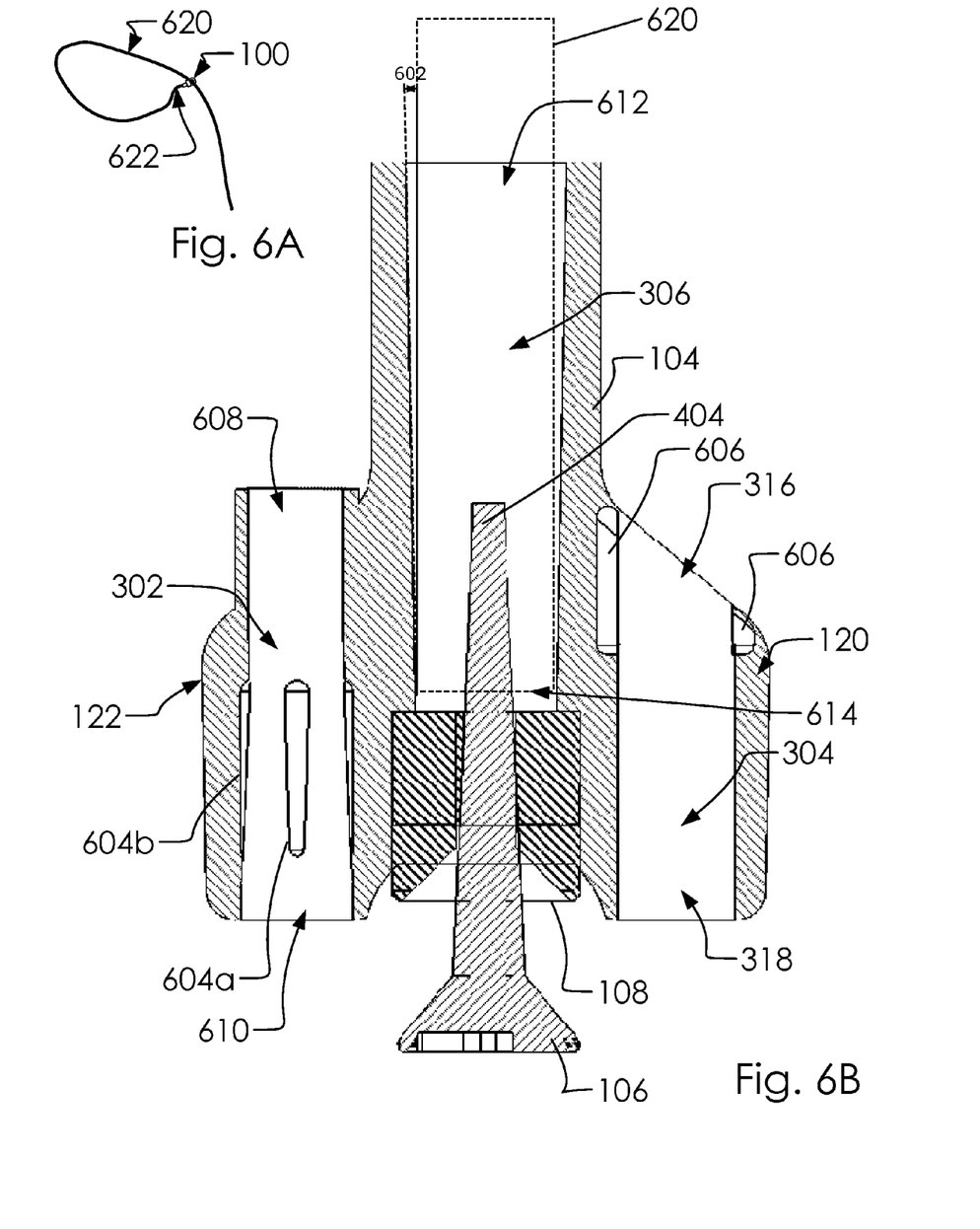
FIGS. 6A and 6B illustrate a perspective overview of said breakaway rope holder with a rope and a cross-section elevated front view of said body, said screw and said weight.

FIGS. 6A and 6B illustrate a perspective overview of said breakaway rope holder 100 with a rope 620 and a cross-section elevated front view of said body 104, said screw 106 and said weight 108. In one embodiment, said rope bore 306 can have a taper 602 which can comprise a 1.5 degree taper. In one embodiment, said first bore 302 can comprise a one or more rib bores (having a first rib bore 604a and a second rib bore 604b). In one embodiment, said one or more rib bores can receive said one or more ribs when said loop 102 is attached to said body 104; wherein said one or more ribs in said one or more rib bores can prevent an axial movement of said loop 102 and attached to said body 104. In one embodiment, said second bore 304 can comprise said first end 316 and said second end 318; wherein, said second bore 304 can comprise a head space 606 at said first end 316 of said second bore 304; further wherein, said head space 606 can receive a portion of said head 208 of said loop 102 and thereby prevent said first end 116 of said loop 102 from sliding through said body 104. In one embodiment, said head space 606 can have a larger internal diameter than said second end 318 of said second bore 304. In one embodiment, said first bore 302 can comprise a first end 608 and a second end 610. In one embodiment, said weight 108 can slide into a portion of said rope bore 306. In one embodiment, said bore 506 can receive and hold a portion of said screw 106. In one embodiment, said rope bore 306 can comprise a first end 612 and a second end 614. In one embodiment, said weight 108 and said screw 106 can be inserted into said rope bore 306 at said second end 614. In one embodiment, said first end 612 of said rope bore 306 can receive a first end 622 of said rope 620; wherein, said breakaway rope holder 100 can hold said first end 622 of said rope 620 by: inserting said first end 622 of said rope 620 into said first end 612 of said rope bore 306; screwing said second end 404 of said screw 106 into said first end 622 of said rope 620 and said body 104 of said breakaway rope holder 100. In one embodiment, a portion of said threading 410 of said screw 106 can dig into a portion of said first end 622 of said rope 620.

Figure 7:
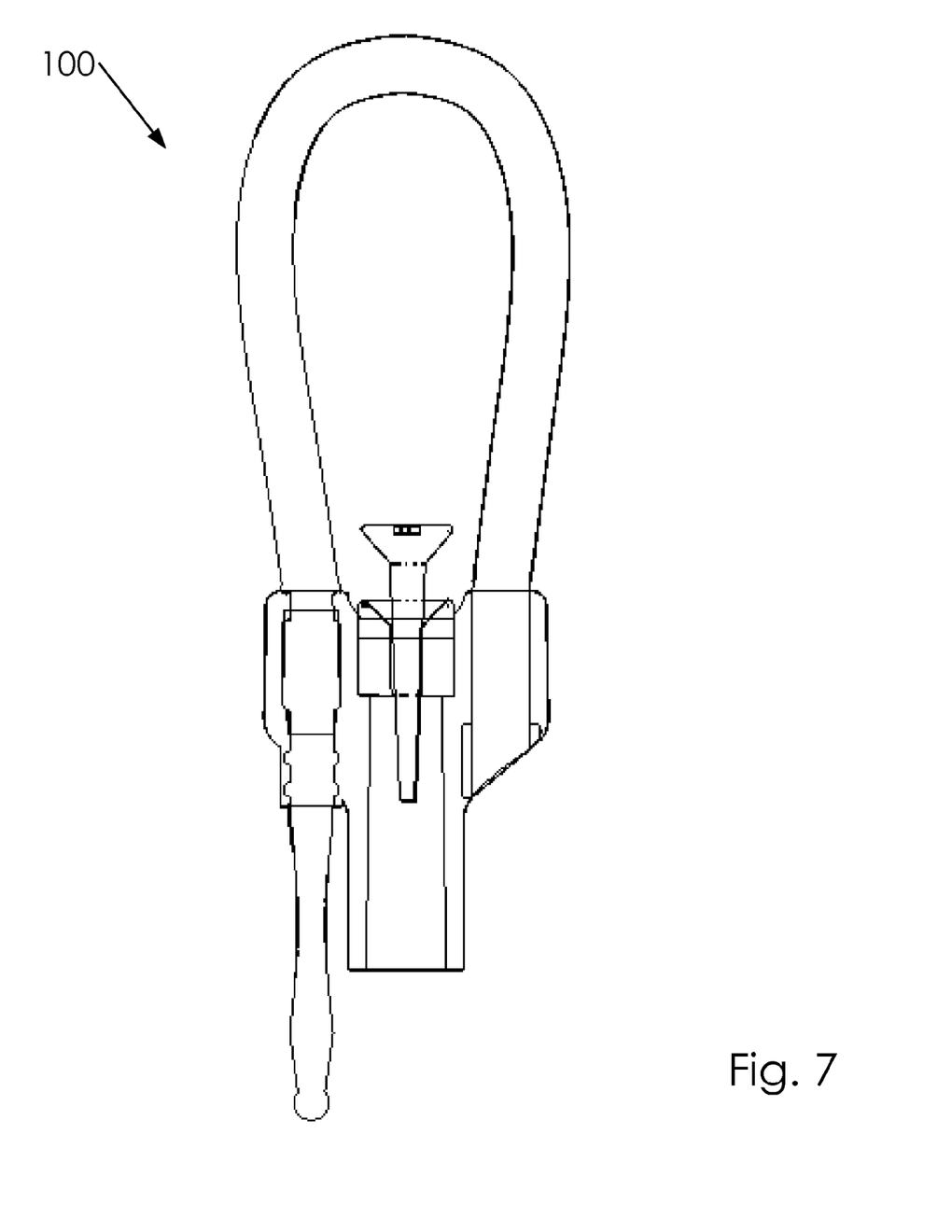
FIG. 7 illustrates an elevated wire-frame front view said breakaway rope holder.

FIG. 7 illustrates an elevated wire-frame front view said breakaway rope holder 100.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:
1. A breakaway rope holder comprising:
   said breakaway rope holder comprising a loop having a first end and a second end, a body having a rope bore;
   said rope bore is capable of receiving a first end of a rope;
   said first end of said loop attaches to said body;
   said second end of said loop releaseably attaches to said body;
   said loop comprises a nylon material;
   said rope bore comprises an aperture cut through said body from a top to a bottom of said body;
   said breakaway rope holder further comprises a screw having a first end and a second end;
   said first end of said screw comprises a screw head;
   said second end of said screw is capable of holding a first end of a rope by:
      inserting into said second end of said screw into said rope bore and
      screwing said screw into said first end of said rope;
   said rope bore comprises a taper of about 1.5 degrees;
   breakaway rope holder further comprises a weight having a bore through a central portion of said weight;
   said weight is capable of attaching to said breakaway rope holder by
      screwing said screw through said bore of said weight and
      holding said weight between said screw head of said screw and said rope;
   said bore of said weight comprises an upper portion having an internal diameter and a lower portion having an internal diameter;
   said internal diameter of said upper portion is larger than said internal diameter of said lower portion;
   said screw head of said screw cannot pass through said lower portion of said bore in said weight;
   said body further comprises a first bore and a second bore;
   said loop comprises a head at said first end of said loop having a larger external diameter than a looping portion of aid loop;
   said loop attaches to said body by:
      inserting said second end of said loop through said second bore,
      sliding a portion of said loop through said second bore,
      preventing said head of said loop from passing entirely through said second bore,
      sliding said second end of said loop through said first bore of said body, and
      holding a portion of said loop in said first bore of said body;

said first bore of said body comprises a one or more rib bores arranged about an internal surface of said first bore;
said loop comprises a one or more ribs arranged about an external portion of said loop;
said breakaway rope holder is capable of holding a portion of said loop in said first bore of said body by:
  locking a portion of said one or more ribs into a portion of said one or more rib bores; and
said loop comprises a substantially cylindrical cross-section.

2. A breakaway rope holder comprising:
said breakaway rope holder comprising a loop having a first end and a second end, a body having a rope bore;
said rope bore selectively receives a first end of a rope;
said first end of said loop attaches to said body;
said second end of said loop releaseably attaches to said body;
said rope bore comprises an aperture cut through said body from a top to a bottom of said body;
said breakaway rope holder further comprises a screw having a first end and a second end;
said first end of said screw comprises a screw head;
said second end of said screw selectively holds a first end of a rope by:
  inserting said second end of said screw into said rope bore and
  screwing said screw into said first end of said rope; and
said breakaway rope holder further comprises a weight which selectively attaches to said breakaway rope holder to change weight characteristics of said breakaway rope holder.

3. The breakaway rope holder of claim 2 wherein:
said loop comprises a plastic material.

4. The breakaway rope holder of claim 2 wherein:
said loop comprises a nylon material.

5. The breakaway rope holder of claim 2 wherein:
said loop comprises a polyethylene material.

6. The breakaway rope holder of claim 2 wherein:
said loop comprises a TPU material.

7. The breakaway rope holder of claim 2 wherein:
said rope bore comprises a taper of about 1.5 degrees.

8. The breakaway rope holder of claim 2 wherein:
said weight having a bore through a central portion of said weight; and
said weight selectively attaches to said breakaway rope holder by
  screwing said screw through said bore of said weight and
  holding said weight between said screw head of said screw and said rope.

9. The breakaway rope holder of claim 8 wherein:
said bore of said weight comprises an upper portion having an internal diameter and a lower portion having an internal diameter;
said internal diameter of said upper portion is larger than said internal diameter of said lower portion; and
said screw head of said screw cannot pass through said lower portion of said bore in said weight.

10. The breakaway rope holder of claim 2 wherein:
said body further comprises a first bore and a second bore;
said loop comprises a head at said first end of said loop having a larger external diameter than a looping portion of said loop; and
said loop attaches to said body by:
  inserting said second end of said loop through said second bore,
  sliding a portion of said loop through said second bore,
  preventing said head of said loop from passing entirely through said second bore,
  sliding said second end of said loop through said first bore of said body, and
  holding a portion of said loop in said first bore of said body.

11. The breakaway rope holder of claim 10 wherein:
said first bore of said body comprises a one or more rib bores arranged about an internal surface of said first bore;
said loop comprises a one or more ribs arranged about an external portion of said loop; and
said breakaway rope holder is capable of holding a portion of said loop in said first bore of said body by:
  locking a portion of said one or more ribs into a portion of said one or more rib bores.

12. The breakaway rope holder of claim 10 wherein:
said loop comprises a one or more torul rings arranged about an external portion of said loop;
said one or more torul rings comprise a larger external diameter than an internal diameter of said first bore; and
said breakaway rope holder is capable of holding a portion of said loop in said first bore of said body by:
  sliding said one or more torul rings through said first bore.

13. The breakaway rope holder of claim 10 wherein:
said body comprises a top portion and a bottom portion;
said first bore and said second bore comprise apertures through said top portion of said body;
said first bore is at a first side of said body and said second bore is at a second side of said body;
said rope bore comprise an aperture through said body from a top to a bottom of said body; and
said rope bore, said first bore and said second bore are substantially parallel to one another.

14. The breakaway rope holder of claim 2 wherein:
said loop comprises a substantially cylindrical cross-section.

15. A method of using a breakaway rope holder comprising:
attaching to a rope bore of said breakaway rope holder at a first end of a rope; wherein,
said breakaway rope holder comprises a loop having a first end and a second end, a body having said rope bore;
said first end of said loop attaches to said body;
said second end of said loop releaseably attaches to said body;
said body further comprises a first bore and a second bore;
said loop comprises a head at said first end of said loop having a larger external diameter than a looping portion of said loop;
said loop attaches to said body by:
  inserting said second end of said loop through said second bore,
  sliding a portion of said loop through said second bore,
  preventing said head of said loop from passing entirely through said second bore,
  sliding said second end of said loop through said first bore of said body,
  holding a portion of said loop in said first bore of said body;
said first bore of said body comprises a one or more rib bores arranged about an internal surface of said first bore;
said loop comprises a one or more ribs arranged about an external portion of said loop; and said breakaway rope holder is capable of holding the portion of said loop in said first bore of said body by
locking a portion of said one or more ribs into a portion of said one or more rib bores.

16. The method of using said breakaway rope holder of claim 15 wherein:
attaching said rope bore to said first end of said rope comprises
inserting a second end of a screw into said rope bore and screwing said screw into said first end of said rope; wherein,
said rope bore comprises an aperture cut through said body from a top to a bottom of said body;
said breakaway rope holder further comprises said screw having a first end and said second end; and
said first end of said screw comprises a screw head.

17. The method of using said breakaway rope holder of claim 16 further comprising altering a weight of said breakaway rope holder by:
screwing said screw through a bore of said weight and
holding said weight between said screw head of said screw and said rope; wherein,
said breakaway rope holder further comprises said weight having said bore
through a central portion of said weight.

18. A breakaway rope holder comprising:
said breakaway rope holder comprising a loop having a first end and a second end, a body having a rope bore;
said rope bore selectively receives a first end of a rope;
said first end of said loop attaches to said body;
said second end of said loop releaseably attaches to said body;
said body further comprises a first bore and a second bore;
said loop comprises a head at said first end of said loop having a larger external diameter than a looping portion of said loop;
said loop attaches to said body by:
inserting said second end of said loop through said second bore,
sliding a portion of said loop through said second bore,
preventing said head of said loop from passing entirely through said second bore,
sliding said second end of said loop through said first bore of said body,
holding a portion of said loop in said first bore of said body;
said first bore of said body comprises a one or more rib bores arranged about an internal surface of said first bore;
said loop comprises a one or more ribs arranged about an external portion of said loop; and
said breakaway rope holder selectively holds the portion of said loop in said first bore of said body by:
locking a portion of said one or more ribs into a portion of said one or more rib bores.

* * * * *